(12) United States Patent
Martel

(10) Patent No.: US 11,645,829 B2
(45) Date of Patent: May 9, 2023

(54) CONTOUR BASED IMAGE SEGMENTATION APPARATUS AND METHOD

(71) Applicant: VY Corporation, Wayne, PA (US)

(72) Inventor: Thomas Martel, Manlius, NY (US)

(73) Assignee: VY Corporation, Wayne, PA (US)

( * ) Notice: Subject to any disclaimer, the term of this patent is extended or adjusted under 35 U.S.C. 154(b) by 187 days.

(21) Appl. No.: 16/815,397

(22) Filed: Mar. 11, 2020

(65) Prior Publication Data

US 2020/0294259 A1    Sep. 17, 2020

Related U.S. Application Data

(60) Provisional application No. 62/816,611, filed on Mar. 11, 2019.

(51) Int. Cl.
| | |
|---|---|
| *G06V 10/44* | (2022.01) |
| *G06T 7/13* | (2017.01) |
| *G06T 7/90* | (2017.01) |
| *G06T 7/12* | (2017.01) |
| *G06T 7/181* | (2017.01) |
| *G06V 10/46* | (2022.01) |
| *G06T 7/136* | (2017.01) |

(52) U.S. Cl.
CPC ............. *G06V 10/457* (2022.01); *G06T 7/12* (2017.01); *G06T 7/13* (2017.01); *G06T 7/136* (2017.01); *G06T 7/181* (2017.01); *G06T 7/90* (2017.01); *G06V 10/471* (2022.01)

(58) Field of Classification Search
CPC ........... G06V 10/457; G06V 30/18076; G06V 10/471; G06V 30/1829; G06V 10/469; G06V 30/1823; G06V 10/473; G06V 30/1831; G06V 10/44; G06V 30/1801; G06V 30/182; G06V 30/1826; G06V 30/1834; G06V 30/1837; G06V 10/46; G06K 9/00; G06T 7/10; G06T 7/12; G06T 7/13; G06T 7/136; G06T 7/181; G06T 7/194; G06T 7/90
See application file for complete search history.

(56) References Cited

U.S. PATENT DOCUMENTS

2017/0091956 A1 *    3/2017    Yu .................... G06K 9/6267

OTHER PUBLICATIONS

Donovan, Timothy P. "Data mining within digital images." Visual Information Processing XVI. vol. 6575. International Society for Optics and Photonics, 2007. (Year: 2007).*

Liu, Xianming, et al. "Understanding image structure via hierarchical shape parsing." 2015 IEEE Conference on Computer Vision and Pattern Recognition (CVPR). IEEE, 2015. (Year: 2016).*

(Continued)

*Primary Examiner* — Geoffrey E Summers

(74) *Attorney, Agent, or Firm* — Neal Blibo LLC; Arlene Neal

(57) ABSTRACT

A Shape Based Modeling Segmentation fits generated Bézier curves on to edges parsed from an object in an image, identifies the Bézier curves in predefined proximity having at least one of a geometric relationship and a reporting relationship with other Bézier curves in the predefined proximity; generates MetaBézier curves from the identified Bézier curves; and connects the MetaBézier curves to identify the object in the image.

17 Claims, 16 Drawing Sheets

(56) References Cited

OTHER PUBLICATIONS

Donovan, Timothy P. "Object recognition in a digital image." Visual Information Processing XI. vol. 4736. International Society for Optics and Photonics, 2002. (Year: 2002).*
Donovan, Timothy P., and Russell E. Zuck. "Edge comparison in a digital image." Visual Information Processing XIV. vol. 5817. International Society for Optics and Photonics, 2005. (Year: 2005).*
Chi, Y-T., C-F. Chien, and T-T. Lin. "Leaf shape modeling and analysis using geometric descriptors derived from Bezier curves." Transactions of the ASAE 46.1 (2003): 175. (Year: 2002).*
Cinque, Luigi, Stefano Levialdi, and Alessio Malizia. "Shape description using cubic polynomial Bezier curves." Pattern Recognition Letters 19.9 (1998): 821-828. (Year: 1998).*
Dixit, Manish, and Sanjay Silakari. "Face recognition using approximated Bezier curve and supervised learning approach." International Journal of Multimedia and Ubiquitous Engineering 10.4 (2015): 311-324. (Year: 2015).*
Günther, Oliver, and Eugene Wong. "The arc tree: An approximation scheme to represent arbitrary curved shapes." International Conference on Foundations of Data Organization and Algorithms. Springer, Berlin, Heidelberg, 1989. (Year: 1989).*

* cited by examiner

CONTOUR BASED IMAGE SEGMENTATION APPARATUS AND METHOD

CROSS-REFERENCE TO RELATED APPLICATIONS

The present application is related to and claims benefit under 35 U.S.C. § 119(e) from U.S. Provisional Patent Application Ser. No. 62/816,611, filed on Mar. 11, 2019, the entire contents of which is incorporated herein by reference.

BACKGROUND OF THE INVENTION

The deep learning field has provided capabilities to analyze large datasets. Conventional edge detection techniques used for detection and classification result in too many false positives because they are not cognizant of shapes and have no awareness of the photometric characteristics of physical objects. Conventional computer vision deep learning systems are dependent on red, green, blue (RGB) color input which is highly variable and relies upon many thousands (or millions) of manually generated training vectors for real-world use cases. Changes in color and orientation require additional training and frequently do not generalize well. As an example, the COCO dataset contains over one million images and nearly ten thousand object categories. The process of creating these datasets is time-consuming and expensive, and the problem grows worse as more deep learning methodologies are integrated into strategic and product development decision-making processes.

A significant problem with computer vision deep learning systems has been the detection of objects within an image and describing their location. The large datasets in use for training to solve this problem are manipulated by people manually, applying labels and defining bounding boxes on all objects. One problem with this approach is that each new object added to the set requires a relabeling. Additionally, with the slightest change to an object, a retraining may be required. In practice, real world images present many "corner cases". These are essentially cases that go outside the normal operation range, causing performance to degrade significantly.

Artificial intelligence and deep learning systems used for image analysis have a significant limitation: there is no way to explain how their decisions are made. Understanding how and why a deep learning system makes decisions is essential to improve and refine future decisions and understand when and how to override a decision. If, for example, a pharmaceutical company is relying on a deep learning system to document the mechanism of a new drug discovery project and an unexpected result arises, the best available option, in most cases, is to throw more training vectors at the problem.

What is needed are is a system and method that can adapt to new situations without requiring additional training vectors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
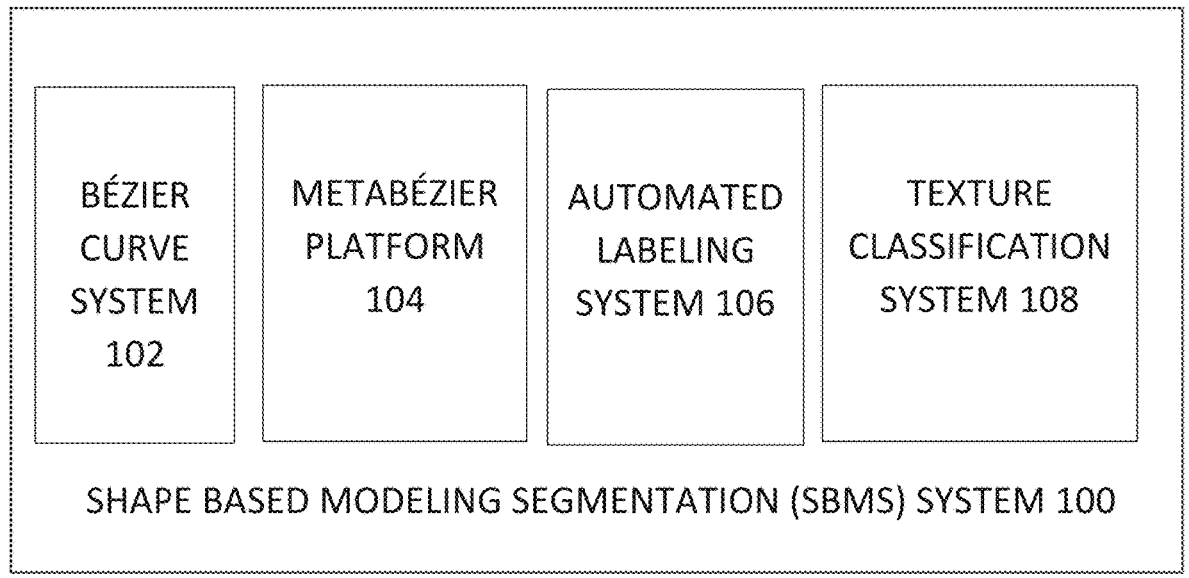
FIG. 1 is a block diagram of a Shape Based Modeling Segmentation (SBMS) system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method comprising fitting generated Bézier curves on to edges parsed from an object in an image, by a Shape Based Modeling Segmentation (SBMS) system; identifying, by the SBMS system, the Bézier curves in a predefined proximity having at least one of a geometric relationship and a reporting relationship with other Bézier curves in the predefined proximity; generating, by the SBMS system, MetaBézier curves from the identified Bézier curves; and connecting, by the SBMS system, the MetaBézier curves to identify the object in the image.

Embodiments are directed to an apparatus and associated method to associate and connect Bézier curves in a way that can be used to accomplish robust object detection in real-world imagery. In order to accomplish robust object detection and recognition under real-world conditions in which several uncontrollable appearance variables must be accommodated, Bézier curves may be examined considering their contextual relationships and similarities.

FIG. 1 is a block diagram of the SBMS system used in accordance with some embodiments. SBMS system 100 applies auditable mathematical models (for example, Bézier curves and decision trees) to images comprised of pixels in order to collect hard data from visual imagery and significantly increase the speed and accuracy of object recognition. SBMS system 100 includes a Bézier curve system 102, a MetaBézier platform 104, an automated labeling system 106, and a texture classification system 108.

Bézier curve system 102 is configured to model fit edges and/or gradient runs parsed from an image into generated Bézier curves. MetaBézier platform 104 is configured to connect MetaBézier curves together in an automated way to identify manmade objects (for example, vehicles and weapons) and anthropogenic objects (for example, construction and streets scenes), with no training. MetaBézier platform 104 is also configured to find Bézier curves at multiple thresholds and multiple resolutions. These Bézier curves are scale and angle invariant, can reliably handle occluded objects, and they can be linked together to reliably to find convex objects, whether occluded or not, with no calibration.

Automated labeling system 106 is configured to use MetaBézier curves to identify specific classes of objects including, for example, an aircraft, a road, a pipeline, a vehicle, a person, or a weapon. Texture classification system 108 is configured to perform robust texture classification including, for example, classification of weather, smoke, gas clouds, oncology diagnostics, plumes with appropriate sensors, and bone density. The functions of one or more of Bézier curve system 102, MetaBézier platform 104, automated labeling system 106, and texture classification system 108 may be implemented on a single computing device or on more than one computing devices.

Bézier curve system 102 is configured to convert ground-truth pixels, generated by conventional image sensors, into Bézier curves of cubic (third) order. Cubic Bézier curves may be used to accurately model elliptical objects around their entire circumference using only four Bézier curves. In some cases, eight Bézier curves may be used to achieve the same accuracy with quadratic Bézier curves.

Cubic Bézier curves are characterized by four geometric points, called "control points." Two of these control points are located at the end points of the Bézier curve. The other two are located in such a way as to give the Bézier curve its desired shape. In an embodiment, the X and Y values of the end control points are integers; the other two control points are floating-point numbers. Movements of the control points modify the shape of the corresponding Bézier curve in a predictable and intuitive way.

Bézier curves are mathematical functions that are expressed in a way that makes it comparatively easy to fit them to characterize real shapes using the control points. They take the form of polynomials having coefficients that are derived from the position of the control points. Bézier curves in two dimensions are described in "parametric form," as two polynomials, each in a parameter traditionally identified as t. One of the polynomials expresses the x-coordinate of one point on the Bézier curve as a function of t, the other polynomial expresses the y-coordinate of the point as a function of t. Because they are in parametric form, the function that describes a given Bézier curve need not be of the form of a mathematical function $y=F(x)$.

Figure 2:
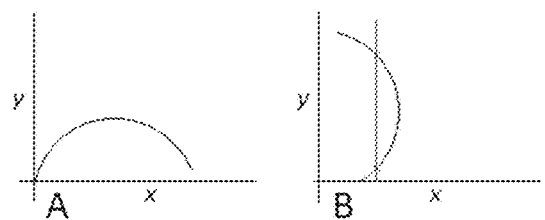
FIG. 2 shows curves used in accordance with some embodiments.

FIG. 2 shows curves used in accordance with some embodiments. In FIG. 2 curve 'A' represents a mathematical function of the form $y=F(x)$. Note that the function $F(x)$ maps each point on the x-axis to exactly one point on the y-axis. Curve 'B', on the other hand, which is simply a copy of curve A rotated through 90°, is not a function in the form $y=F(x)$; this can be seen by observing the vertical line, which intersects the curve at two distinct values of y for the same x.

Bézier curves circumvent this problem by means of parameterization. Each Bézier curve is represented by two separate polynomials of the same order (for example, a third order, or cubic) that are coupled by both being expressed in terms of the same independent variable (or parameter) t. One polynomial gives the value of x in terms of t, the other gives the value of y in terms of t. This can be succinctly expressed as follows: $y_t=F_y(t)$ and $x_t=F_x(t)$. In two dimensions, the Bézier curve itself is generated as t is swept from zero to one. This makes Bézier curves uniquely suited for describing general edges in images. Three-dimensional Bézier curves are possible, as are two-dimensional Bézier surfaces that exist in three-dimensional space.

In an embodiment, Bézier curve system 102 is configured to identify edges in an image by using a slope threshold detection algorithm. The slope threshold detection algorithm operates in four directions (up, down, right, and left). Bézier curve system 102 is further configured to identify those edges that are "continuous enough" to justify the effort (in CPU cycles), fit Bézier curves to points in "smooth enough" edges, and for each set of fittable points, select one of several conventional Bézier-fit algorithms to find the best-fitting Bézier curve for an edge in the image. The choice of a Bézier-fit algorithm may be made according to the shape characteristics of the "smooth enough" edge.

During "model fitting" or "model building", Bézier curve system 102 makes observations, suggests and describes a hypothesis, enumerates its implications, and designs an experiment to test the hypothesis. The hypothesis takes the form of a structure that can take many possible interchangeable forms. The common format these interchangeable forms share is that they can be expressed as a sequence (string) of symbols.

A Bézier curve is a hypothesis, a shape is a hypothesis, the silhouette of an object is a hypothesis; each of which is testable by reference to the objective pixels that make up the underlying image. In order to create a shape hypothesis, whether in the form of a Bézier curve, or in the form of any other shape primitive, Bézier curve system 102 determines which parts of the image have no hope of explanation under one of the available hypotheses or models. Such regions may include those characterized by noise, random or chaotic textures, or complexity of an order that cannot be perceived at the spatial resolution of the images that are available for analysis. Examples would include foliage (grass, leaves of trees, shrubbery), pavement surfaces, small ripples and waves on the surface of bodies of water, etc.

While there may sometimes be important details lurking within scene regions of shape hypotheses, the resolution level may be changed for the structure of such details to become visible to a camera and to the analytical process behind the camera. The resolution level can go in either direction; it may be just as useful to decrease the resolution as to increase it, in order to gather significant information from these regions. An initial survey may encompass every region of the image because in order to discover that a given region is not worthy of further analysis, it may be necessary to expend some analytical bandwidth on it.

Bézier curve system 102 is configured to parse an image into "edges" and "gradient runs." Edges are generally tree structures, made up of large numbers of "trigger pixels," (i.e., pixels that have the characteristic of being located where the brightness undergoes a rapid change in one of four directions (North, South, East, or West)). Edges tend to become trees in the general case because nothing can guarantee that the end of a given edge—perhaps corresponding to the boundary of some object or feature of an object—will come to a well-defined end at precisely the point that corresponds to the visible edge of that object. Another nearby object, for example, a background feature or a lighting artifact such as a shadow, may give rise to a continuation of the apparent edge in a manner that has nothing to do with the morphology of the object to which the original edge corresponds.

Regions that are neither edges nor gradient runs are those in which edges that may be present are lacking sufficient contrast to be detected under current lighting conditions. Once a first-pass survey is complete, the resulting orderly edges (recovered from locations that are in general buried deep within a tree structure) are submitted to a Bézier-fitting algorithm. By the time a Bézier fit process takes place, the pixels that make up the putative Bézier curve are already precisely known.

The parsing of the image into orderly edges and the fitting of Bézier curves to these edges opens the door to the discovery of morphological hierarchy between Bézier curves. This hierarchy illuminates an authority system of confidence that exists between Bézier curves that arise from a real physical object. The hierarchy between Bézier curves does not exist with pixels arising from noise or from objects at the extreme limit of resolving power of the camera-optics-lighting system. The discovery of the hierarchy is based on a geometric correspondence between Bézier curves detected at different sensitivity thresholds and/or different levels of resolution.

Sensitivity thresholds and resolution levels can be obtained, for example, by changing a trigger threshold for edge detection, by down-sampling the image by simple (and therefore robust) pixel averaging methods, or by more physical means, such as by changing illumination power, the placement of illumination sources, or by moving the camera platform itself in order to put more pixels on the object under examination. This may be done by issuing commands to a motion-control system to which a camera is attached, as in the case of a robotic platform.

After Bézier curve system 102 fits and generates Bézier curves from an image, MetaBézier platform 104 is configured to identify the Bézier curves in a predefined proximity. The Bézier curves within the predefined proximity have at least one of a geometric relationship and a reporting relationship with other Bézier curves in the predefined proximity. MetaBézier platform 104 is configured to generate MetaBézier curves from the Bézier curves within the predefined proximity A MetaBézier curve is a Bézier curve that has been corroborated within the predefined proximity MetaBézier curves have a geometric relationship with other nearby Bézier curves within the predefined proximity in the image and is generated based upon corroboration or reporting relationships with the nearby Bézier curves within the predefined proximity MetaBézier shape elements solves the practical necessity of decreasing the number of raw Bézier curves that were generated from a single object boundary.

MetaBézier platform 104 generates MetaBézier curves and connects the MetaBézier curves in an automated manner to identify, for example, manmade objects: streets, construction sites, and other objects of potential interest. MetaBézier curves establish a hierarchy between Bézier curves detected at different thresholds, for example, a resolution and sensitivity level. When taken together, the hierarchical arrangement of Bézier curves has greater credibility (for example, for direction of curvature and boundary location) than does any individual Bézier curve, thereby dramatically improving reliability and decreasing training time.

Figure 3:
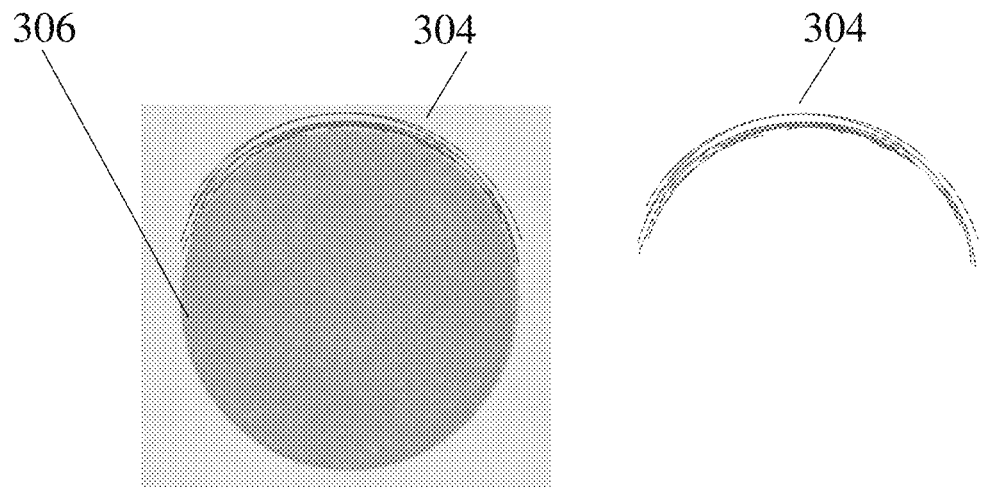
FIG. 3 shows several first-generation Bézier curves used in accordance with some embodiments.

FIG. 3 shows several first-generation Bézier curves generated in accordance with some embodiments. Bézier curve system 102 generates Bézier curves 304 from a simple object 306. The left side of FIG. 3 shows Bézier curves 304 around the edges of object 306 and the right side of FIG. 3 shows Bézier curves 304 separated from object 306.

Figure 4:
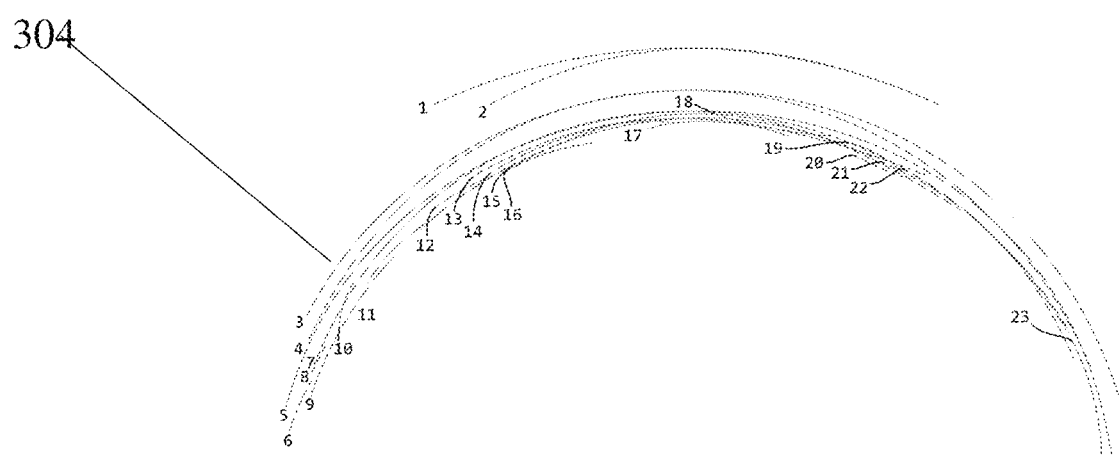
FIG. 4 shows the first-generation Bézier curves of FIG. 3 as separate and distinct Bézier curves in accordance with some embodiments.

FIG. 4 shows the first-generation Bézier curves of FIG. 3 as separate and distinct Bézier curves in accordance with some embodiments. Bézier curves 304 shown in FIG. 4 includes twenty-three separate, distinct Bézier curves at four levels of resolution and three threshold levels.

Figure 5:
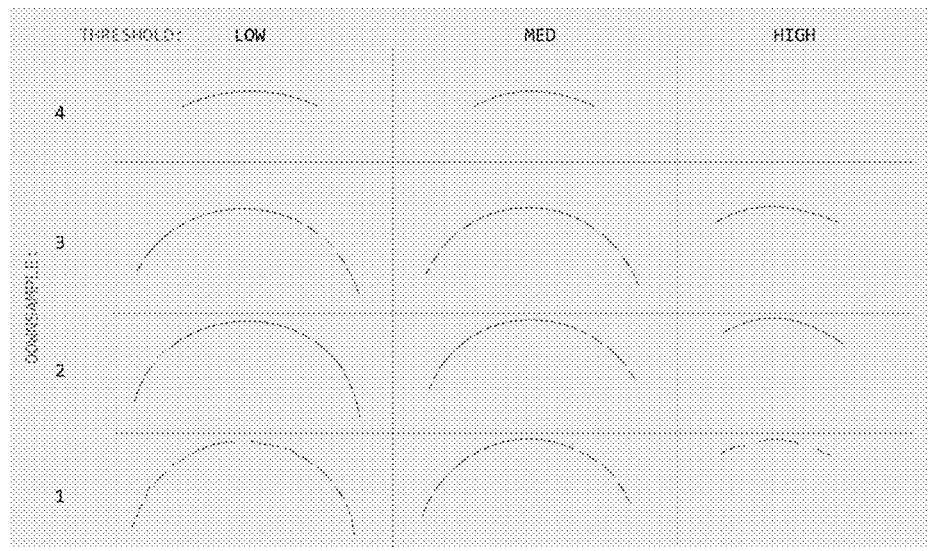
FIG. 5 shows the Bézier curves of FIG. 3 arranged by down-sample and brightness thresholds in accordance with some embodiments.

FIG. 5 further shows the Bézier curves of FIG. 3 arranged by down-sample and brightness thresholds in accordance with some embodiments. The Bézier curves are down-sampled at four levels, with each level having a low, medium and high-resolution brightness threshold.

Figure 6:
FIG. 6 shows a closed contour object in real-world conditions in accordance with some embodiments.

FIG. 6 shows a closed contour object in real-world conditions in accordance with some embodiments. An image 602, taken at a parade under natural outdoor lighting conditions, contains several closed-contour objects 606 (in this case, medallions), one of which 606a is within rectangle 604.

Figure 7:
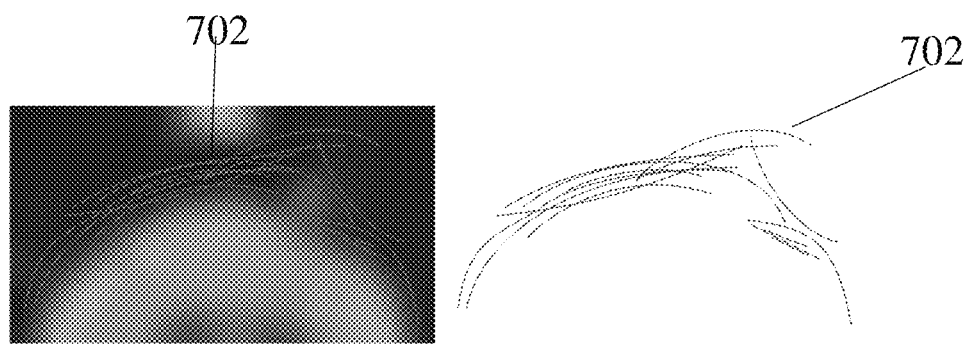
FIG. 7 shows the Bézier curves that are generated from a center medallion in FIG. 6 in accordance with some embodiments.

FIG. 7 shows the Bézier curves that are generated from the center medallion in accordance with some embodiments. Bézier curve system 102 generates fourteen Bézier curves 702 from the center medallion 606a. While it's obvious to a human observer that Bézier curves 702 represent a single object, writing software to accomplish this is difficult because of the large number of possible connected paths through the group. MetaBézier platform 104 uses MetaBézier curves to reduce the amount of branching of a search tree that develops when connecting raw Bézier groups into a credible boundary of an object.

Figure 8:
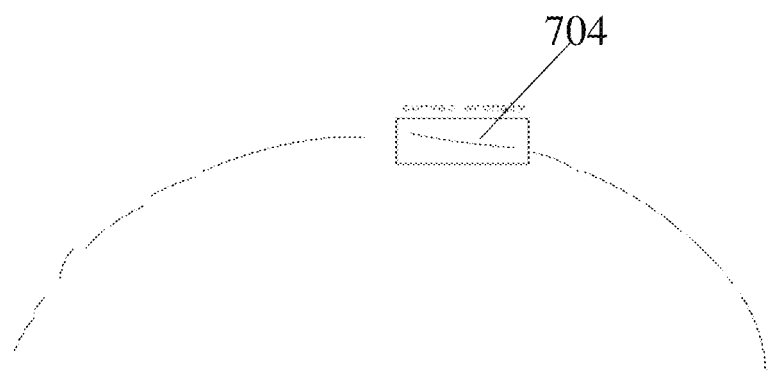
FIG. 8 shows a wrongly oriented Bézier curve of FIG. 7 in accordance with some embodiments.
Figure 9:
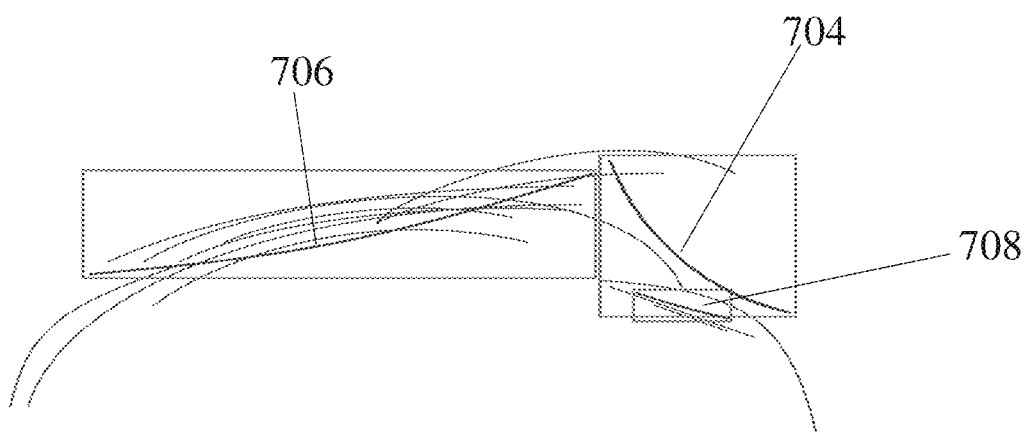
FIG. 9 further shows the wrongly oriented Bézier curve of FIG. 7 in accordance with some embodiments.

Raw Bézier curves sometimes curve in the wrong direction, as shown by Bézier curves 704, 706 and 708, wherein FIGS. 8 and 9 further shows the wrongly curved Bézier curve of FIG. 7 in accordance with some embodiments.

Lower-resolution Bézier curves have a very low probability of curving incorrectly, but are less accurate for locating the actual, literal edge of an object. Conversely, higher-resolution Bézier curves are more accurate in their characterization of the location of literal edges but have a higher probability of incorrect curvature. Having an accurate assessment of which Bézier curves are curved correctly is important for locating and segmenting objects because one can link the correctly curved Bézier curves together in a closed path in many cases. Even in those cases where occlusions, shadows, or other appearance variables interrupt the visible closed path around a particular object, a certain fraction of the enclosing boundary path may be visible, from which the identity of the object can be ascertained and the non-visible portion of the enclosing boundary extrapolated from a geometrical model of that object which is stored in vector form; this is referred to as an "object model".

Figure 10:
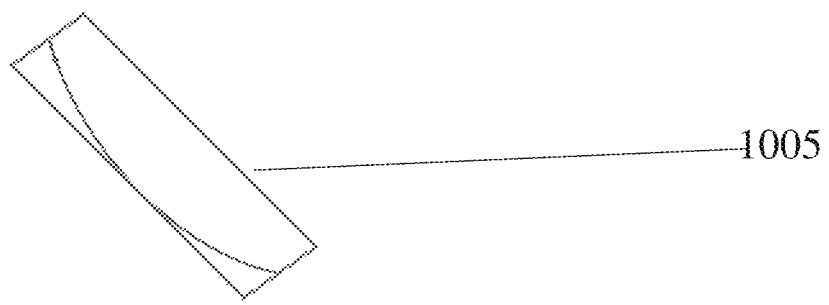
FIG. 10 shows wraptangles used in accordance with some embodiments.

MetaBézier platform 104 establishes a hierarchy of authority within groups of Bézier curves located within a proximity to one another. MetaBézier platform 104 makes the initial association by way of "wrapping" or applying rectangles or wraptangles 1005 to connected Bézier curves. Wraptangles are bounding rectangles that are defined by a line segment that connects the endpoints of each Bézier curve, as shown in FIG. 10. Wraptangles 1005 are used to "stitch together" related Bézier curves into a connected object. The vertices of these wraptangles 1005 are in general located at non-integral coordinates and are represented using floating-point numbers. Corners of wraptangles 1005 may be numbered 0, 1, 2, 3 going clockwise around the rectangle, see FIG. 11.

Within the wraptangles 1005, MetaBézier platform 104 looks to find other Bézier curves and establishes a hierarchy based on a threshold, for example, resolution. As described above, the lower-resolution Bézier curves have a high probability of curving in the correct direction (i.e., being oriented to be concave toward the interior of the object that is to be recognized and isolated). MetaBézier platform 104 uses this directionality preference of Bézier curves as a means for linking a set of boundaries Bézier curves into a closed path that would enclose an object to be recognized and isolated. Geometric rules characterized mainly by angular displacement criteria could then be used to assign a class identity to the object based on shape.

Figure 11:
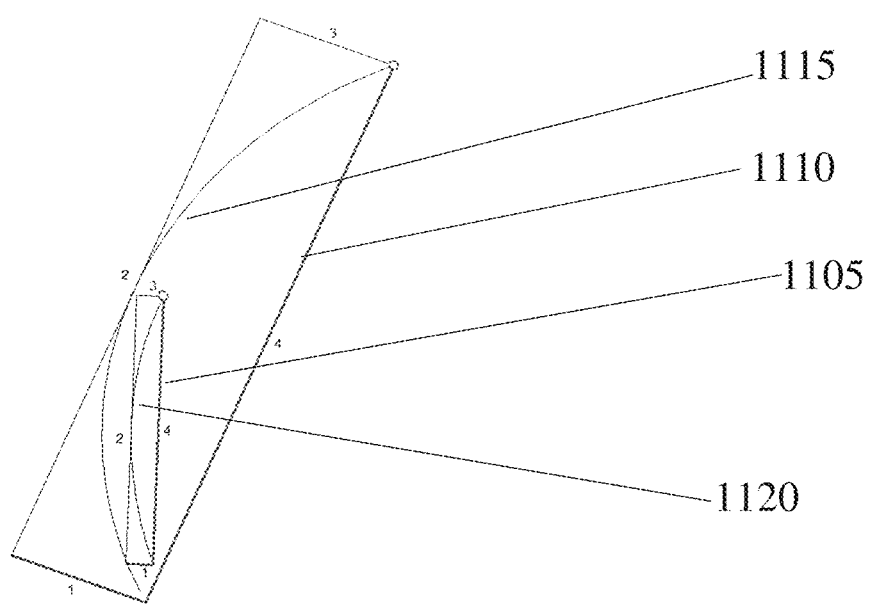
FIG. 11 shows the relationship between higher-authority and lower-authority, corroborating Bézier curves in accordance with some embodiments.

FIG. 11 shows the relationship between higher-authority and lower-authority, corroborating Bézier curves in accordance with some embodiments Small (lower authority) Bézier curve 1120 enclosing wraptangles 1105 is completely enveloped within the enclosing wraptangles 1110 of the larger (higher authority) Bézier curve. 1115. This overlap establishes the authority relationship between larger Bézier 1115 and Bézier curve 1120. Each Bézier curve in the image has some number N of "reporting" Bézier curves that answer to it, or over which it has authority. That number N may be zero. This authority relationship acts as a filter to restrict the number of Bézier curves that need to be compared for possible association for many future operations and is a big timesaver once established.

Figure 12:
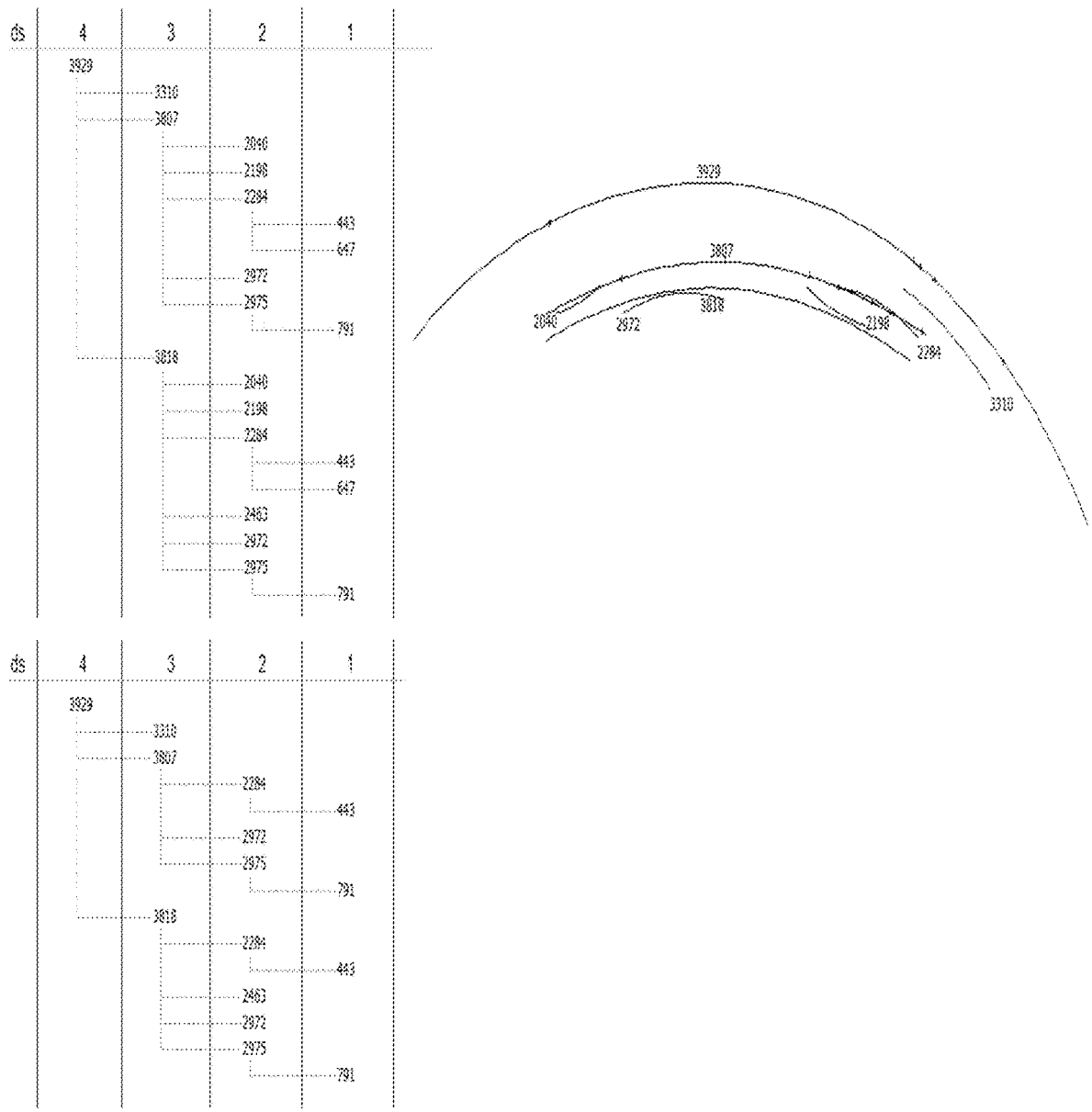
FIG. 12 shows a chain-of-command tree for the relationship established between the Bézier curves in FIG. 11 in accordance with some embodiments.

FIG. 12 shows a chain-of-command tree for the relationship established between the Bézier curves in FIG. 11 in accordance with some embodiments. In FIG. 12, is a set of authority and reporting Bézier curves and the tree structure that represents them is outlined, wherein the "ds" heading on the table at left stands for "downsample," and indicates the degree of downsampling that took place for each Bézier curve. Thus, Bézier curve 3929 is the lowest resolution (that is, most downsampled) Bézier curve. Bézier curves 3310, 3807, and 3818 report to Bézier curve 3929, and each of those Bézier curves has Bézier curves reporting to it. The right-most column in the table contains Bézier curves that have been downsampled only once. The difference between the upper table and the lower table is that the upper table contains all Bézier curves in the reporting relationship, while the lower table omits those Bézier curves having curvature that is not compatible with the authority Bézier curve.

Figure 13:
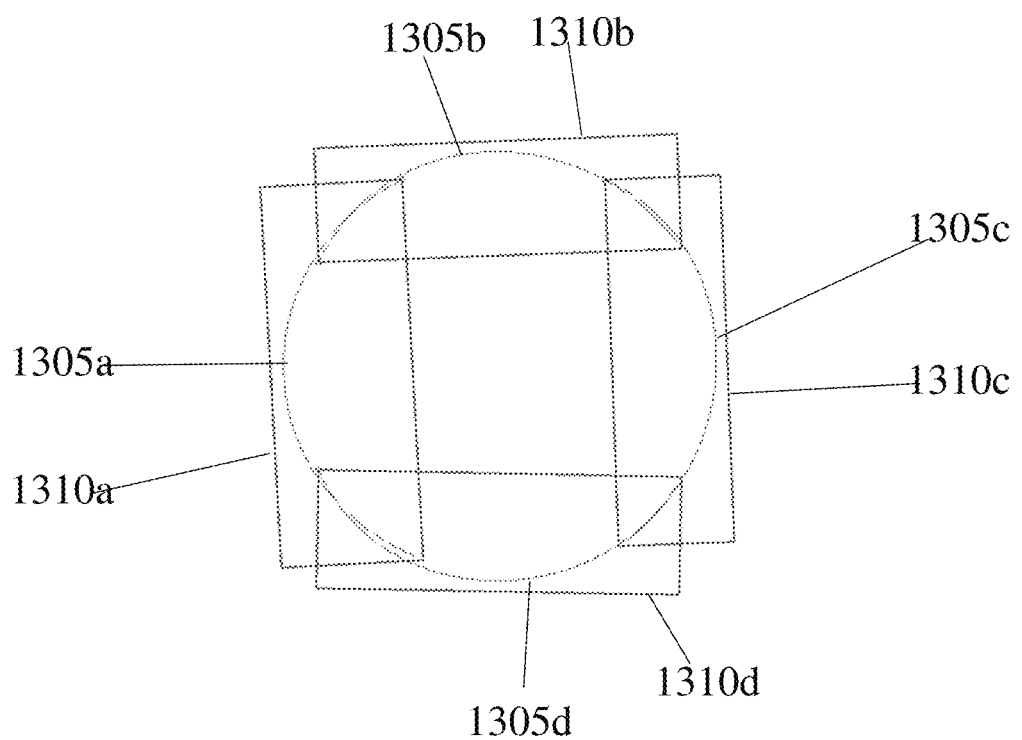
FIG. 13 shows BiBézier in accordance with some embodiments.

FIG. 13 shows BiBéziers used in accordance with some embodiments. In an embodiment, MetaBézier platform 104 implements a full-cycle boundary path goal-seeking algorithm using search trees. MetaBézier platform 104 uses only MetaBézier curves 1305a-1305d and therefore uses Bézier curves appearing at any downsample and threshold level with at least one level of corroboration (a depth below of at least one, wherein depth below is the depth of the associated Bézier curves (like layers of subordinate relationships in an organization chart)). MetaBézier platform 104 creates BiBézier curves, for example 1305a and 1305b, using pairs of related Bézier curves linked via Wraptangles 1310a and 1310b.

Figure 14:
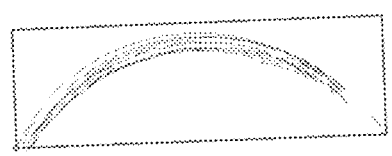
FIG. 14 shows all citing Bézier curves in accordance with some embodiments.

FIG. 14 shows the citing Bézier curves in accordance with some embodiments. For example, FIG. 14 shows the citing Bézier curves when a Bézier curve is selected.

Figure 15:
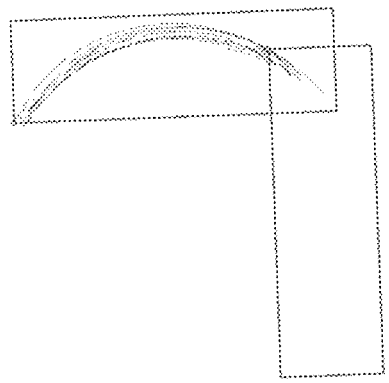
FIGS. 15 and 16 show Bézier curves having the property that one of its corner vertex point falls within a wraptangle of an already-selected Bézier curve.
Figure 16:
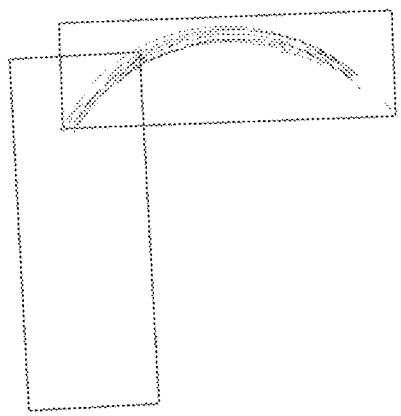

FIGS. 15 and 16 show Bézier curves having the property that one of its corner vertex point falls within a wraptangle of an already-selected Bézier curve. FIG. 15 shows Bézier curves having the property that its "Corner 0" vertex point falls within a wraptangle of the already-selected Bézier curve. FIG. 16 shows Bézier curves having the property that its "Corner 3" vertex point falls within a wraptangle of the already-selected Bézier curve.

Figure 17:
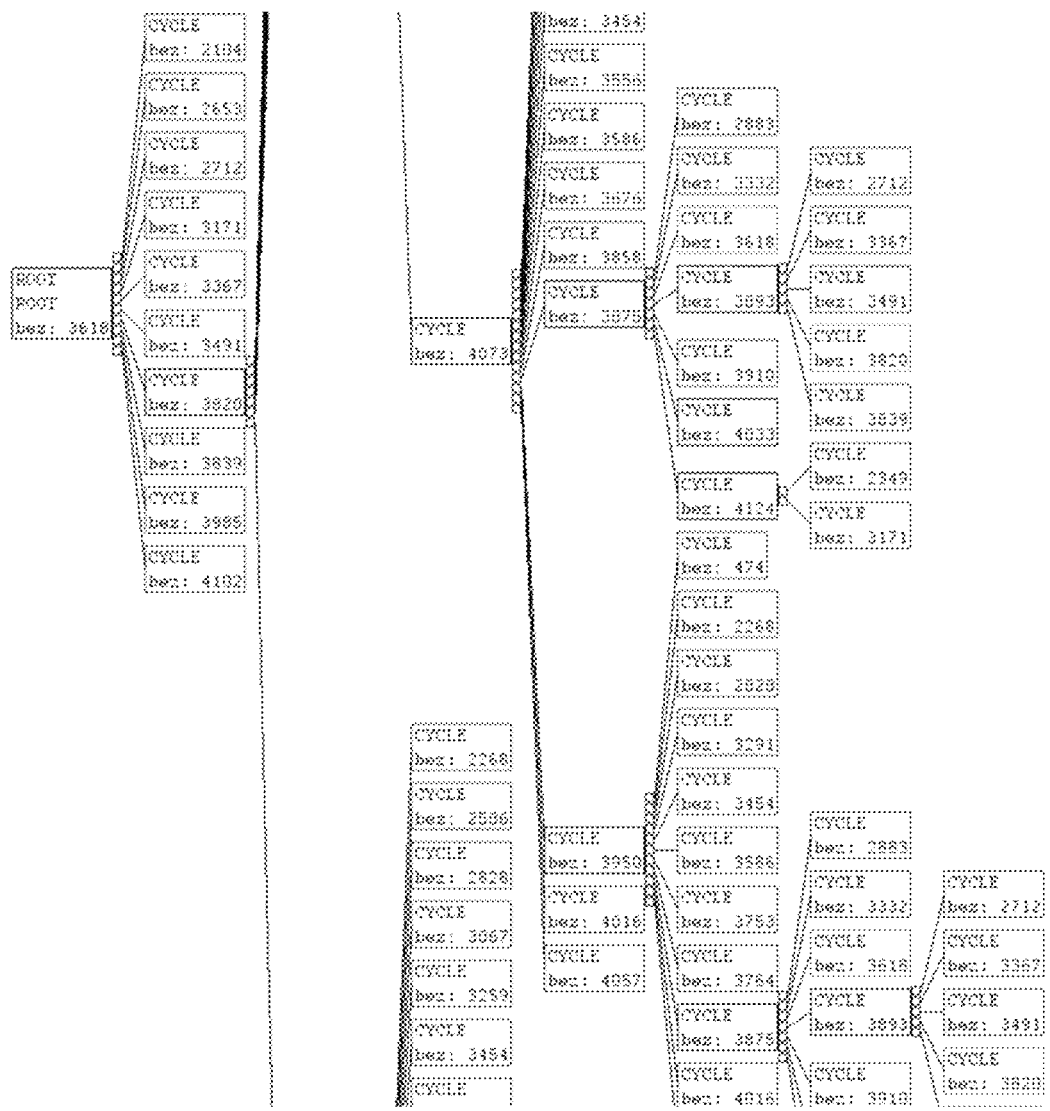
FIG. 17 shows a decision tree showing calculations for all the Bézier elements composed of cycle nodes for a test object of FIG. 13 in accordance with some embodiments.

Returning to FIG. 13 that shows MetaBézier curves describing a connected test object, in this case a circle, FIG. 17 shows a decision tree showing calculations for the Bézier elements composed of cycle nodes for the test object in accordance with some embodiments. Cycles is the concept of finding closed paths among Bézier curves in an image. Such closed paths generally define objects.

Figure 18:
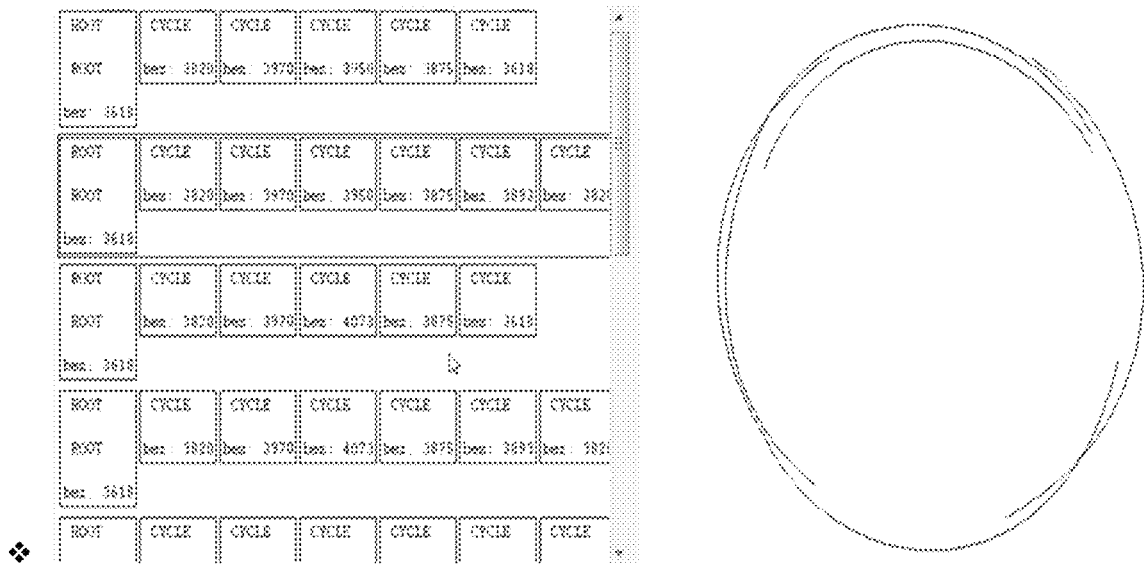
FIG. 18 shows all the correct cycles corresponding to the test object of FIG. 13 in accordance with some embodiments.

FIG. 18 shows the correct cycles and corresponding Bézier curves that correspond to the test object of FIG. 13 in accordance with some embodiments. Unlike deep learning systems that have no way to determine how a decision was made, SBMS system 100 provides a powerful framework to attack the problems of auditability, opacity, and reliability.

Using this process, MetaBézier platform 104 may execute a full-cycle boundary path goal-seeking algorithm using search trees and MetaBézier curves. This methodology uses Bézier curves appearing at any down-sample and threshold level, if they have at least one level of corroboration which is expected to solve the problem of excessive tree branch proliferation.

Figure 19:
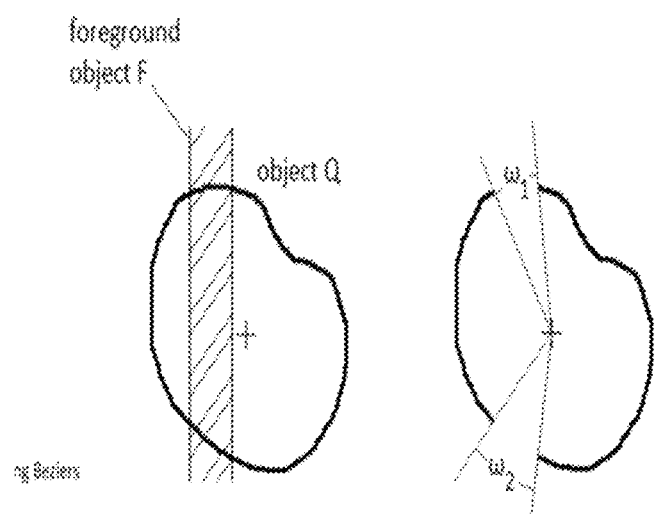
FIG. 19 shows a partially occluded object in accordance with some embodiments.

MetaBézier platform 104 may also be configured to fill in the gaps of a partially occluded section of an object. FIG. 19 shows a partially occluded object in accordance with some embodiments. Object Q is partially occluded by Object F. Background object Q demonstrates how an occlusion can be measured based upon the degree to which it is occluded by Object F. Omega 1 and 2 represent angular sectors of the perimeter. Their sum gives the degree of occlusion as a number. Bézier curves provide a powerful methodology to model the component parts of an object's perimeter (Object Q in this case) and can be used to "fill in the gaps" based upon the target object's description.

An embodiment allows for the handling of color in the context of MetaBézier curves. As noted above, MetaBézier curves include a hierarchical arrangement of Bézier curves arranged by authority level, with low resolution Bézier curves at the top of the hierarchy and high resolution Bézier curves at the bottom of the hierarchy. It should be noted that the hierarchical order may be reversed and still fall within the scope of the invention. As such, each Bézier curve in the hierarchy has zero or more Bézier curves to which it answers and which answers to it, or both, depending on the hierarchical level.

Figure 20:
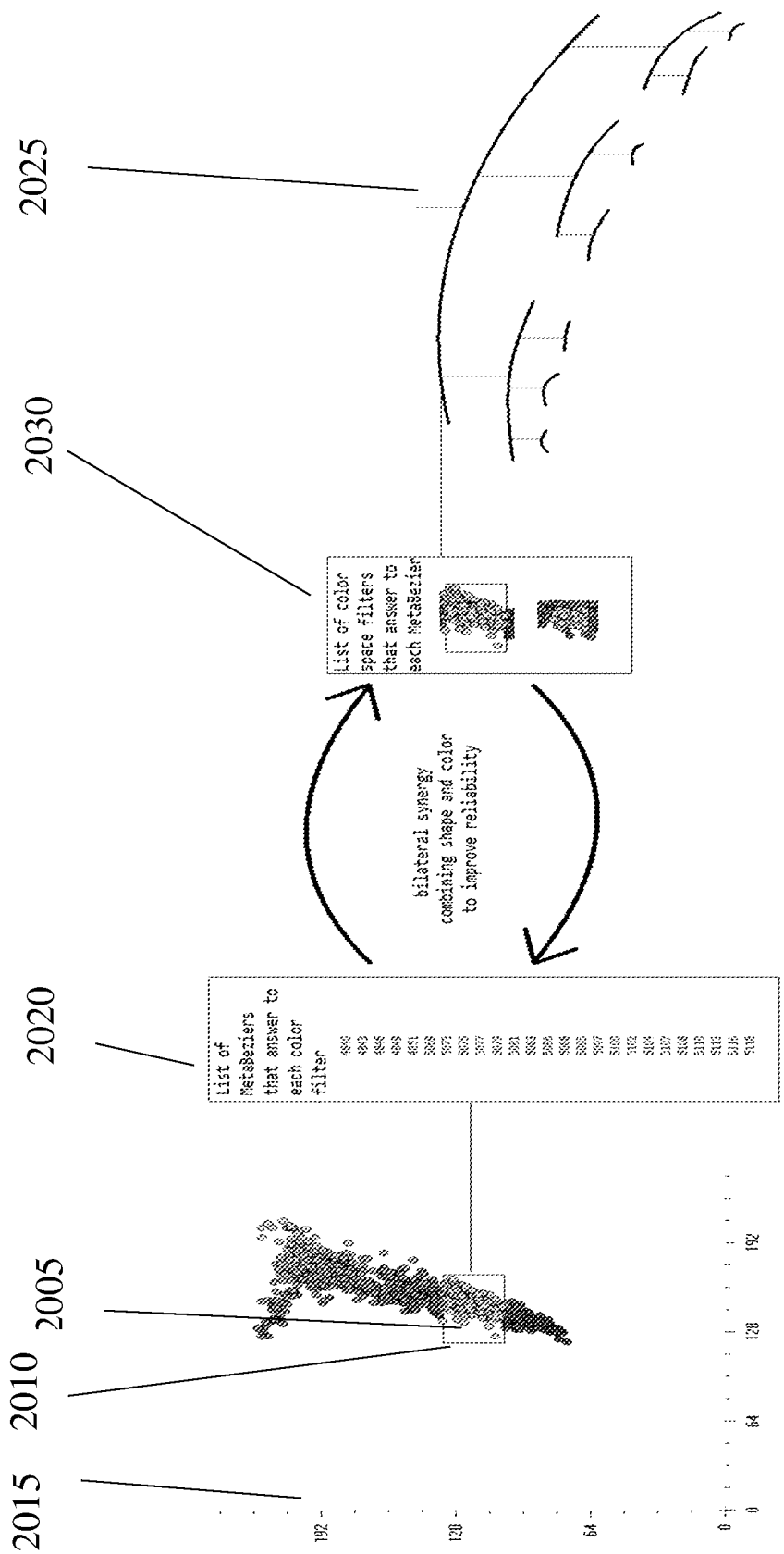
FIG. 20 shows a collection of images for relating MetaBézier curves to a color space in accordance with some embodiments.

This embodiment provides another answering bilateral relationship that uses Bézier shape and color space, i.e., the RGB values that match to a three-dimensional space. FIG. 20 shows a collection of images for relating MetaBézier curves to a color space in accordance with some embodiments. In FIG. 20, on the top, a two-dimensional scatter graph 2015 shows a color space representation of the MetaBézier curves distribution and a list 2020 includes the identification numbers of the MetaBézier curves in scatter graph 2015. 2025 on the bottom of FIG. 20 shows the spatial relationship of Bézier curves that make up MetaBézier curves and list 2030 shows a list of the filters within each Bézier curves. As shown by the arrows, a bilateral relationship exists between the top and bottom portions of FIG. 20.

The color space is represented as a series of planes, wherein the scatter graph 2015 shows the RGB value of Blue on the horizontal line, the RGB value of red on the vertical line, and green is orthogonal. Within the plane of the color space, a filter represented by a shape, for example, rectangle 2010, is applied to the color space. As such, the color geometry may be represented by a set of rectangular (or other shape) filter regions in the color space. Using the filters, the MetaBézier curves may be related to (or answer to the filters) the color space.

In an embodiment, each circle 2005 in the color space represents one MetaBézier curve and each circle is configured by taking all RGC value pixels that are touched by the MetaBézier curve and averaged to measure the color nearby the MetaBézier curve because the averaging is based on a shape sensitive curve. Each filter 2010 delineates a region within color space and each filter 2010 has a certain number of MetaBézier curves that answer to it. Each MetaBézier curve also answers to N number of filters, with N being zero if the MetaBézier curve is not included in any filter, or one or greater if the MetaBézier curve is included in one or more filters. The collection of filters delineates a composite region within color space. This allows MetaBézier curves to be related filters As shown on the bottom of FIG. 20, a physical geometry is represented by a set of Bézier curves linked by the MetaBézier structure. Each MetaBézier structure corresponds to a physical object. Objects are represented by a collection of MetaBézier curves. This structure integrates conformal photometry/colorimetry with shape and object recognition in a manner that makes the information associated with each domain easily available to the other for discovering and characterizing objects and areas of interest.

Figure 21:
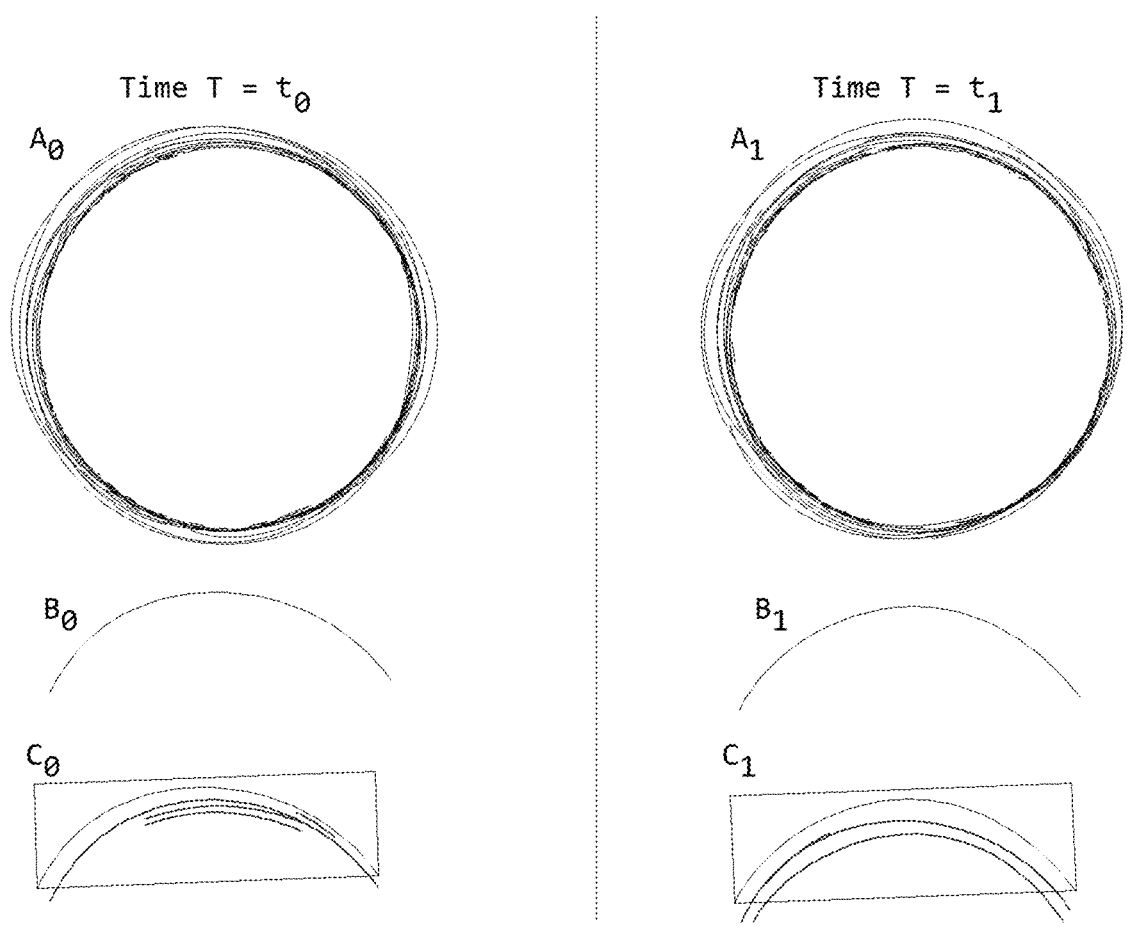
FIG. 21 shows an approach for using SBMS Bézier curves to generate high-credibility tracking of physical objects by means of corroboration passed from a set of Bézier curves generated at two different points in time in accordance with some embodiments.

MetaBézier platform 104 may also be configured to characterize change over time. FIG. 21 shows an approach for using SBMS Bézier curves to generate high-credibility tracking of physical objects by means of corroboration passed from a set of Bézier curves generated at two different points in time in accordance with some embodiments. In this Figure, A represents the Bézier curves associated with the test object, B represents one "senior"/higher authority Bézier curve and its associated subordinates at two different points in time. C represents the associated subordinate Bézier curves at two higher resolution levels.

Figure 22:
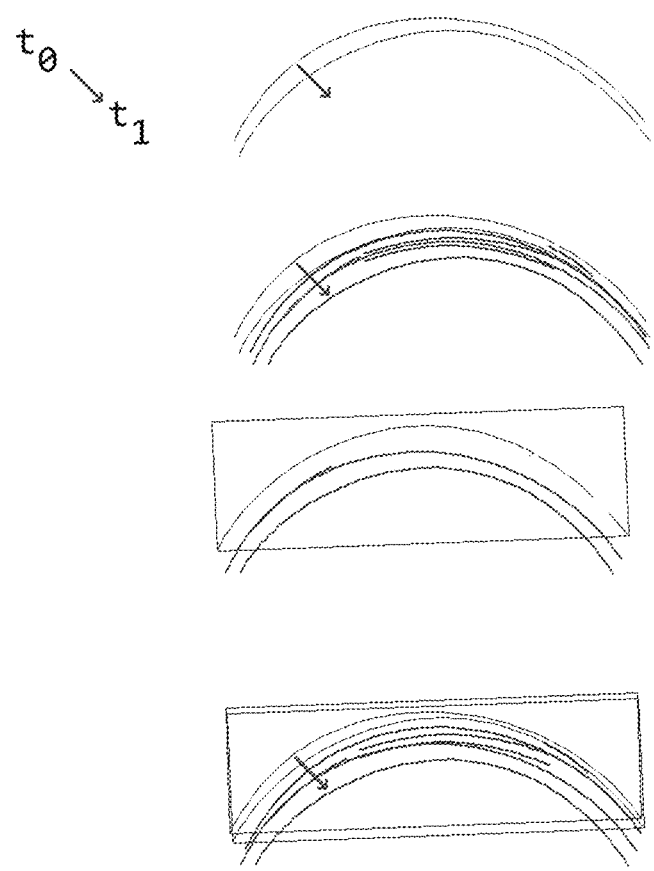
FIG. 22 shows how physical objects are tracked by corroboration passed from one set of Bézier curves at time $0-T_0$ and time $1-T_1$ in accordance with some embodiments.

FIG. 22 shows how physical objects are tracked by corroboration passed from one set of Bézier curves at time $0-T_0$ and time $1-T_1$ in accordance with some embodiments. The MetaBézier concept based upon discovering spatial congruency between Bézier curves that are fitted at different resolutions and sensitivity thresholds can be extended to include congruency between Bézier curves that are generated at different points in time by an object that has moved. The arrow graphically identifies the movement between $T_0$ and $T_1$. Using this approach, MetaBézier curves represent a robust methodology to identify, characterize and quantify change detection, and depending upon the use case and the information available, velocity information.

SBMS system 100 therefore, does not rely upon training. Rather, SBMS system 100 relies upon the naturally occurring order in the image to distinguish edges from gradients arising from texture and noise. SBMS system 100 provides a straight-forward process for writing rules to identify the objects and areas of interest.

Figure 23:
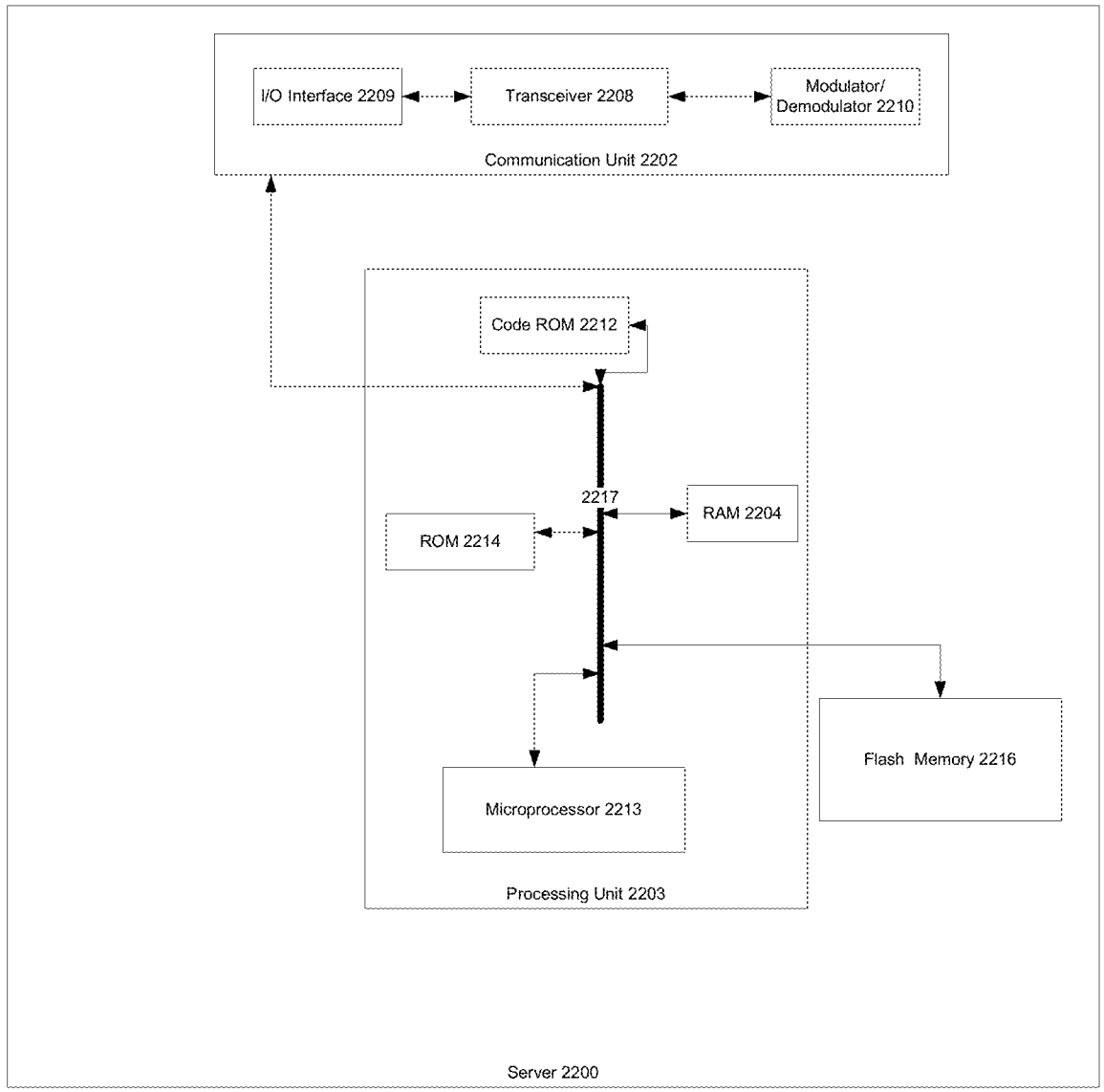
FIG. 23 is a block diagram of a computing device on which SBMS system 100 may be executed in accordance with some embodiments.

FIG. 23 is a block diagram of a computing device on which SBMS system 100 may be executed in accordance with some embodiments. Server 2200, for example, may include a communications unit 2202 coupled to a common data and address bus 2217 of a processor 2203. The processor 2203 may include a code read-only memory (ROM) 2212 for storing data for initializing system components of server 2200. The processor 2203 may further include a microprocessor 2213 coupled, by the common data and address bus 2217, to one or more memory devices, such as a read-only memory (ROM) 2214, a random access memory (RAM) 2204, and/or a static or flash memory 2216. One or more of ROM 2214, RAM 2204 and flash memory 2216 may be included as part of processor 2203 or may be separate from, and coupled to, the processor 2203.

Communications unit 2202 may include a wired or wireless input/output I/O interface 2209 configurable to communicate with network components and other user equipment within its communication range. Communications unit 2202 may include one or more broadband and/or narrowband transceivers 2208 and/or other similar type of wireless transceiver configurable to communicate via a wireless network for infrastructure communications. Communications unit 2202 may also include one or more local area network or personal area network transceivers. The transceivers may be coupled to a combined modulator/demodulator 2210. The one or more memory devices 2212, 2214 and 2216 are configured to store non-transitory computer-executable instructions to perform a set of functions such as one or more of the steps set forth in FIG. 24

Figure 24:
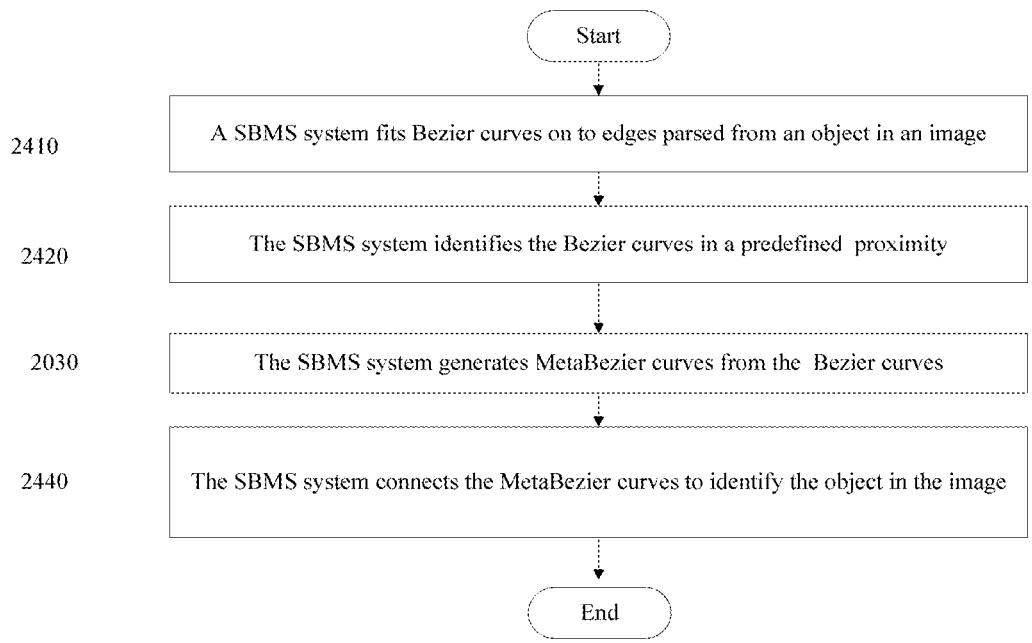
FIG. 24 shows steps implemented in accordance with some embodiments.

FIG. 24 shows the steps implemented in accordance with some embodiments. In 2410, the SBMS system fits generated Bézier curves on to edges parsed from an object in an image. In 2420, the SBMS system identifies the Bézier curves in a predefined proximity. The Bézier curves in the predefined proximity have at least one of a geometric relationship and a reporting relationship with other Bézier curves in the predefined proximity. In 2430, the SBMS system generates MetaBézier curves from the identified Bézier curves. In 2440, the SBMS system connects the MetaBézier curves to identify the object in the image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   fitting generated Bézier curves on to edges parsed from an object in an image, by a Shape Based Modeling Segmentation (SBMS) system having a processor;
   identifying, by the SBMS system, Bézier curves in a predefined proximity, the Bézier curves having at least one of a geometric relationship and a reporting relationship with other Bézier curves in the predefined proximity;
   generating, by the SBMS system, MetaBézier curves from identified Bézier curves; and
   connecting, by the SBMS system, the MetaBézier curves to identify the object in the image.

2. The method of claim 1, wherein the generating comprises establishing a hierarchy between the Bézier curves in the predefined proximity and applying wraptangles to related Bézier curves.

3. The method of claim 2, further comprising finding the Bézier curves within the wraptangles and establishing a hierarchical relationship based on a resolution threshold.

4. The method of claim 1, wherein the generating comprises establishing a hierarchy between the Bézier curves at a threshold, wherein the threshold includes at least one of resolution threshold and a sensitivity threshold.

5. The method of claim 4, further comprising obtaining the threshold by at least one of changing a trigger threshold for edge detection, and down-sampling the image by pixel averaging applications.

6. The method of claim 1, wherein the connecting comprises using directionality preference of the Bézier curves to link a set of boundaries Bézier curves into a closed path that would enclose the object.

7. The method of claim 1, wherein the connecting comprises using Bézier curves appearing at any downsample and threshold level with at least one level of corroboration.

8. The method of claim 1, wherein the connecting comprises executing a full-cycle boundary path goal-seeking process using search trees and the MetaBézier curves.

9. The method of claim 1, wherein the fitting comprises converting pixels generated by an image sensor into Bézier curves.

10. The method of claim 1, further comprising using the MetaBézier curves to identify a specific class of objects.

11. The method of claim 1, further comprising discovering congruency between Bézier curves that are generated at different points in time by moving the object.

12. The method of claim 1, further comprising creating BiBézier curves using pairs of related Bézier curves linked via wraptangles.

13. The method of claim 1, wherein the generating comprises representing a color space as at least one plane, applying a filter shape in the color space to the MetaBézier curves and relating MetaBézier curves to a color space.

14. The method of claim 13, further comprising representing one MetaBézier curve as a circle in the color space.

15. A Shape Based Modeling Segmentation (SBMS) system comprising:
 a Bézier curve system having a processor to fit generated Bézier curves on to edges parsed from an object in an image; and
 a MetaBézier platform having a processor to identify Bézier curves in a predefined proximity, the Bézier curves having at least one of a geometric relationship and a reporting relationship with other Bézier curves in the predefined proximity, generate MetaBézier curves from identified Bézier curves, and connect the MetaBézier curves to identify the object in the image.

16. The SBMS system of claim 15, further comprising:
 an automated labeling system having a processor to use the MetaBézier curves to identify specific classes of objects.

17. A computing device, comprising:
 a memory configured to store non-transitory computer-executable instructions;
 a transceiver; and
 a processor configured to perform a set of functions including:
 fitting generated Bézier curves on to edges parsed from an object in an image;
 identifying Bézier curves in a predefined proximity, the Bézier curves having at least one of a geometric relationship and a reporting relationship with other Bézier curves in the predefined proximity;
 generating MetaBézier curves from identified Bézier curves; and
 connecting the MetaBézier curves to identify the object in the image.

* * * * *